United States Patent [19]
Hammerquist

[11] 3,854,910
[45] Dec. 17, 1974

[54] APPARATUS FOR REMOVING PARTICLES FROM AN AIRSTREAM

[76] Inventor: Peter A. Hammerquist, 3419 S.W. Knollwood, Corvallis, Oreg. 97330

[22] Filed: Sept. 21, 1972

[21] Appl. No.: 290,798

[52] U.S. Cl............ 55/287, 55/294, 55/302, 55/334, 55/337, 55/374, 55/379, 55/DIG. 26
[51] Int. Cl............ B01d 46/04, B01d 50/00
[58] Field of Search ............ 55/284, 285, 286, 293, 55/294, 295, 296, 334, 337, 361, 362, 363, 364, 365, 373, 374, 375, 378, 287, 301, 302, 303, 350, DIG. 26, 379, 340, 291, 300, 304, 305, 288, 282, 469, 473

[56] References Cited
UNITED STATES PATENTS

| | | | |
|---|---|---|---|
| 540,720 | 6/1895 | Clark | 55/302 |
| 1,124,684 | 1/1915 | Allen | 55/379 |
| 1,830,097 | 11/1931 | Dollinger | 55/294 |
| 2,369,649 | 7/1942 | Abrams | 55/287 |
| 2,976,953 | 3/1961 | Haas et al. | 55/379 |
| 3,120,432 | 2/1964 | Aldrich | 55/334 |
| 3,373,545 | 3/1968 | Christianson | 55/293 |
| 3,377,783 | 4/1968 | Young | 55/302 |

Primary Examiner—Frank W. Lutter
Assistant Examiner—David L. Lacey
Attorney, Agent, or Firm—Klarquist, Sparkman, Campbell, Leigh, Hall & Sparkman

[57] ABSTRACT

A dust removal apparatus adapted for use in conjunction with a conventional centrifugal dust collector comprises a cylindrical chamber for mounting on top of such dust collector, said chamber supporting a plurality of bags in outboard relation which are exposed to the atmosphere. The dust coming from the centrifugal separator is deposited within the bags and subsequently removed by a traveling arm which successively collapses each of the bags against an inner cage.

18 Claims, 3 Drawing Figures

APPARATUS FOR REMOVING PARTICLES FROM AN AIRSTREAM

BACKGROUND OF THE INVENTION

As pollution control becomes more effective, many manufacturing plants with conventional dust removal equipment have been faced with the prospect of designing or obtaining entirely new equipment. Such equipment is often unavailable, or would force at least temporary shutdown of the manufacturing facility for installation and experimentation with the new equipment. Many manufacturing plants have heretofore employed centrifugal dust collectors which are effective for removing larger particles from an airstream, but which frequently expel smaller particles into the atmosphere. Substitution of new, more refined equipment for the present devices is possible but expensive.

Centrifugal collector apparatus can be replaced by or used in conjunction with a conventional bag installation. In such equipment, a plurality of bags are arranged over supporting cages, and dust-laden air is passed from the exterior of the bag to the interior of the bag so that dust collects on the bag exterior. When a quantity of dust has been collected in this manner, a mechanism produces a reverse airflow through a bag, i.e., from inside the bag to outside the bag, causing the unwanted material to fall from or be expelled from the exterior of the bag for collection therebelow. Equipment of this kind is not only inclined to be rather complex and expensive, but moreover requires a substantial installation change for manufacturing facilities presently using centrifugal separators and the like. Also, a fairly strong air current from a fairly powerful blower may be required for expelling air from the exterior of the bag since each bag exterior is already subject to the pressure of the dust-laden airstream. This factor can add to the expense of the equipment.

SUMMARY OF THE INVENTION

In accordance with the present invention, a plurality of bags are mounted for receiving a dust-laden airstream therewithin, whereby dust collects within said bags as the bags are expanded by the airstream. The bags are exposed externally to the atmosphere, providing an optimum pressure drop and the capability of handling a fairly large volume of air. Dust is selectively removed from the bags by a means which provides suction for collapsing the bags and withdrawing material therefrom.

In accordance with a preferred embodiment of the present invention, the bags are provided with internal cage structures smaller in volume than the interior volume of the bags, whereby the bags collapse against such structure as air is withdrawn for enhancing expulsion of the unwanted dust. The volume of the interior cage structure is suitably between one-half and three-quarters the inside volume of the bags.

The system according to the present invention is preferably mounted upon the top of a conventional centrifugal separator, for receiving the exhaust from such separator and filtering the finer particles therefrom. The bags are suspended in midair around the periphery of a structure on top of the centrifugal separator, the structure further including a sweep arm for withdrawing material from the bags. An appreciable portion of the exterior size of the present apparatus comprises the exposed bags themselves and as a consequence the expense of the improved system is greatly reduced. The construction achieved is easily employed in conjunction with existing dust-removal equipment, without forcing plant shutdown for the installation of a more expensive dust-removal system.

It is accordingly an object of the present invention to provide an improved dust-removal system for industrial airstreams and the like.

It is a further object of the present invention to provide an improved dust-removal system compatible with already existing dust-removal equipment.

It is another object of the present invention to provide an improved dust-removal system which is effective, inexpensive, and easy to operate.

It is a further object of the present invention to provide an improved dust-removal system which can be installed with a minimum of interference with industrial plant operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
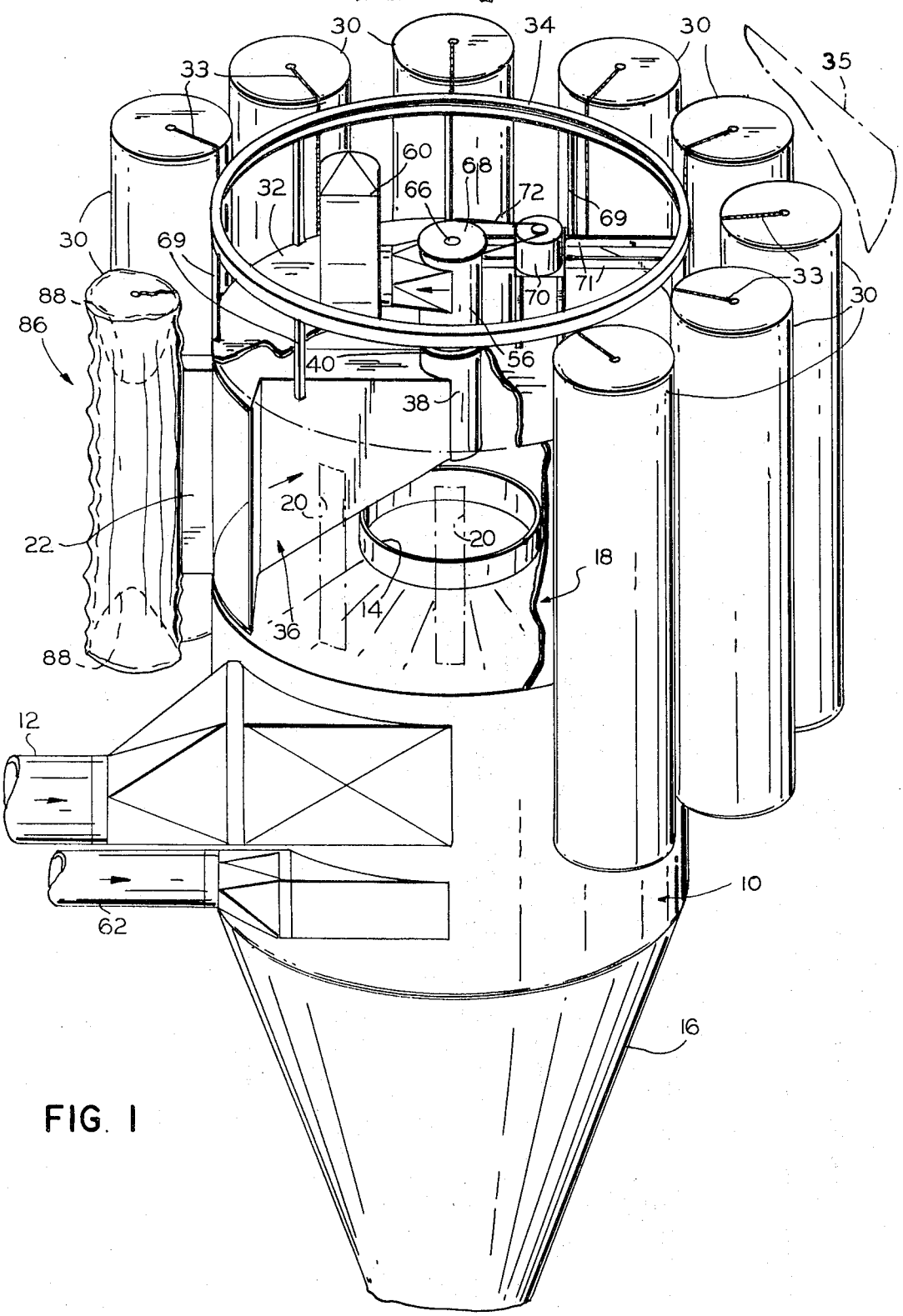
FIG. 1 is a perspective view of a system according to the present invention.
Figures 2, 3:
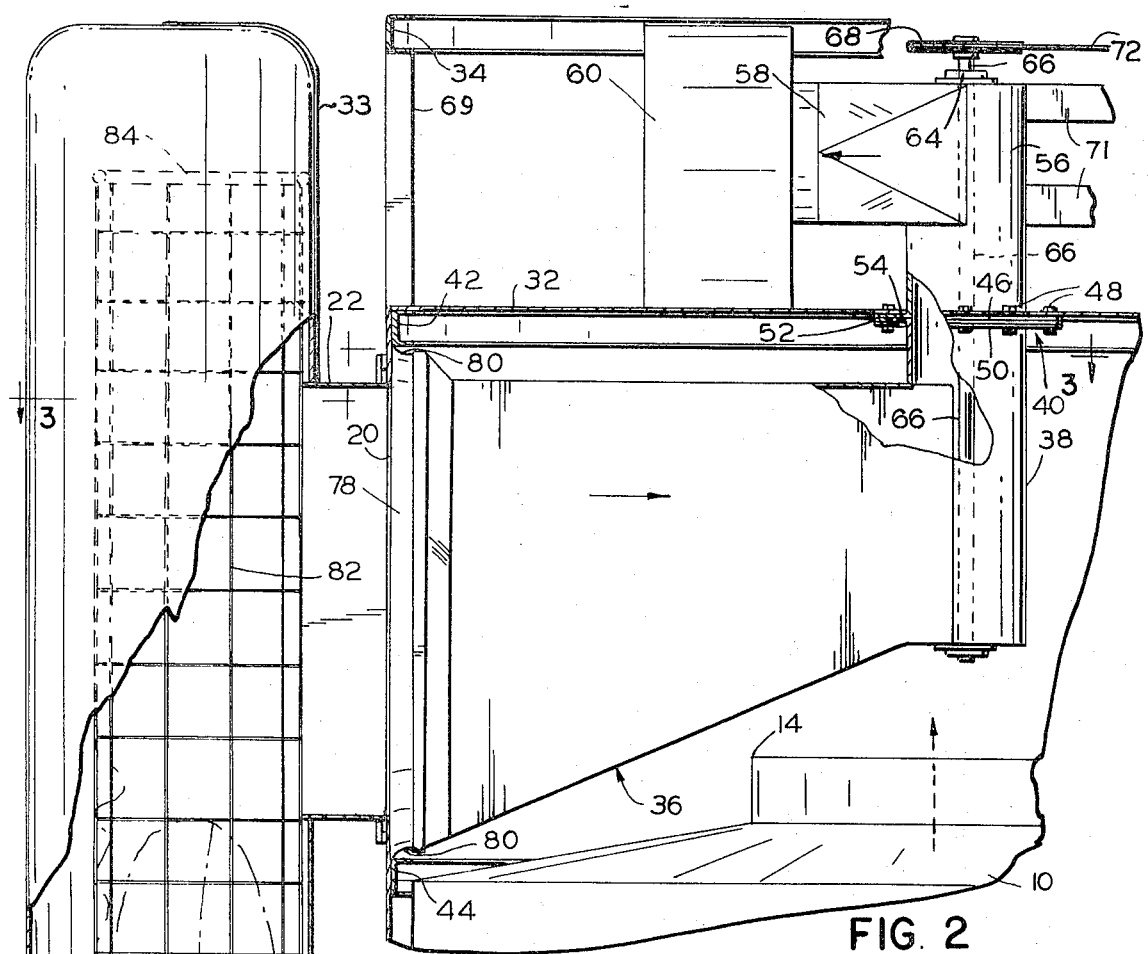
FIG. 2 is a partial vertical cross section of the system according to the present invention.
FIG. 3 is a partial horizontal cross section taken at 3—3 in FIG. 2.

Referring to the drawings, an apparatus according to the present invention for removing fine dust particles from an airstream is in general adapted to be used in conjunction with conventional dust collecting apparatus, for example a centrifugal dust collector or separator 10 sometimes called a "cyclone" separator. The centrifugal collector 10 receives an airstream from a duct 12 under pressure from fan means (not shown), and the partially cleansed air exits from the separator via duct 14 located on the upper side thereof. The dust particles removed from the airstream are deposited in a lower bin 16.

According to the present invention, a cylindrical chamber 18 is disposed on top of centrifugal collector 10 and is closed except for the aforementioned duct 14, and except for a plurality of rectangular openings 20 disposed in spaced parallel fashion in the cylindrical sidewall of chamber 18. The total cross-sectional area of openings 20 is suitably equal to the cross sectional input area of duct 14. The sidewall of chamber 18 is suitably formed of sheet metal disposed between an upper rolled channel 42, and a lower rolled channel 44 secured to the top of the collector 10 structure.

Each of the openings 20 is extended by a matching rectangular passage means 22 disposed radially outwardly therefrom in supporting relation to a metal cage 24. The openings 20 are elongated in a substantially vertical direction, longitudinal of the chamber 18, and are desirably disposed at uniformly spaced intervals about the chamber 18. Thus the matching passage means 22 are long and narrow, extending radially outwardly from chamber 18 at spaced intervals about chamber 18.

In addition to supporting cages 24, each of the passage means 22 is further supplied with a rope guide 26 for receiving the hem or margin 28 surrounding an opening in a substantially cylindrically shaped bag 30, typically formed of canvas. Each bag 30 is substantially pervious to the passage of air but is otherwise closed except for the openings defined by respective hems 28. Each hem 28 is supplied therewithin with a rope which is drawn up tight within rope guide 26 whereby the bag is thoroughly secured to the passage means 22.

The chamber 18 has a flat roof 32 positioned on channel 42 for supporting drive apparatus hereinafter fully disclosed, and from which the bags 30 may be changed from time to time by maintenance personnel. For the purpose of removing the bags, the same are also suitably supplied with a zipper 33 extending from the aforementioned hem or margin 28 to at least one end of the bag, whereby the bag can be removed from passage means 22 and cage 24, so another bag may be placed thereupon. The roof 32 of chamber 18 is suitably provided with a guide rail 34 supported on uprights 69, and may also be supplied with a conical roof, only a portion of which is indicated at 35. This roof may be supported above rail 34 (by means not shown) for protecting equipment and personnel from the elements, and further for protecting bags 30 which are otherwise exposed to the outside atmosphere above a manufacturing plant or the like. However, the bags 30, desirably formed of canvas, are themselves weatherproof and do not require the added protection of roof 35 in most instances. If desired, a full or partial flat roof may be extended across rail 34 to protect equipment thereunder.

The interior of chamber 18 is further supplied with a sweep arm 36 for successively communicating with each of the openings 20. The sweep arm is hollow and formed of sheet metal, having a cross section near the outside periphery of chamber 18 somewhat larger than one of the openings 20. The sweep arm extends inwardly to a location near the cylindrical axis of chamber 18, where the sweep arm is joined to a hollow, rotatable, cylindrical duct 38 communicating with the hollow interior of arm 36 for withdrawing an airstream therefrom. It is noted the arm 36 is vertically foreshortened as the arm proceeds inwardly whereby the arm 36 avoids the outlet duct 14 from centrifugal separator 10. The duct 38 extends downwardly from a thrust bearing 40, the latter being supported from roof 32 and channel 42.

The thrust bearing 40 suitably comprises an upper plate or flange 46 of duct 56 secured by a plurality of bolts 48 to a lower annular plate 50 spaced from plate 46 by an annular spacer plate 52. Radial flange 54 located at the top of duct 38 is positioned between plates 46 and 50 whereby the duct 38 is supported and constrained to rotational movement. The lower portion of sweep arm 36 may be supported upon channel 44 if desired in sliding relation thereto, and a bearing or caster (not shown) may be attached to the lower end of sweep arm 36 for engaging the upper surface of channel 44.

Via bearing 40, duct 38 communicates with hollow, stationary, cylindrical duct 56. Duct 56 is closed except for a communicating duct 58 extending laterally to a blower 60 operated in such fashion as to cause a flow of air in the direction indicated by the arrows, i.e., through sweep arm 36 to duct 38 and from there via ducts 56 and 58 to the blower. The outlet of this blower is further communicated by duct work not shown to an inlet 62 at the lower end of separator 10 whereby additional material collected will be deposited in hopper 16. A thrust bearing 64 is located in the top wall of duct 56 and supports a vertical shaft 66 extending downwardly through ducts 56 and 38, being secured to the closed bottom of duct 38. A sprocket 68 is secured to the upper end of shaft 66 and is driven by motor 70 via drive chain 72 at a slow rate. The sweep arm may be operated and rotated one revolution every few hours causing the arm successively to communicate with the respective passage means 22 and provide a lower pressure or suction with respect to atmospheric pressure outside the bags. Blower 60 as well as motor 70 are supported on roof 32 of chamber 18. Motor 70 and duct 56 are further secured by braces 71 extending between an upright 69 and blower 60.

The sweep arm 36 includes a mouth portion 74 in the form of a flared horn having a dimension peripheral of chamber 18 extending the distance between centerlines of adjacent openings 20. Thus, as the sweep arm 36 rotates slowly, the mouth portion 74 thereof will start communicating with the next opening as soon as it starts to leave a previous opening. The sides 76 of mouth portion 74 are vertical, that is axial of chamber 18, and are provided with plastic wipers 78 for engaging the inside wall of cylindrical chamber 18. Similarly, the upper and lower lips of mouth portion 74 are also provided with plastic wipers 80 for forming a better seal with respect to each opening 20.

Cages 24, supported from respective passage means 22, suitably comprise a fairly wide mesh, stiff, cylindrical wire structure 82 extended between a pair of hose-wrapped conduit hoops 84 at the respective ends thereof. This cage is of such a size that it encompasses a cylindrical volume, the most desirable size of which has been found to be approximately four-ninths the volume of the bag. Thus, the height of cage 24 is desirably about two-thirds the expanded height of bag 30 and the diameter of the cage is such that its circular cross-sectional area is about two-thirds of the cross-sectional area of the expanded bag. As will hereinafter more fully appear, it is desired that the bag collapse rapidly when the sweep arm 36 communicates therewith, whereby the dust collected therewithin will be more rapidly dislodged and withdrawn through the sweep arm 36. The cage must be smaller than the bag, but must be large enough so that the material within the bag can still be effectively removed.

Considering operation of the apparatus according to the present invention, dust particles not removed from the airstream by centrifugal separator 10 will leave such separator via its outlet duct 14, and would normally be blown into the atmosphere via stack means (not shown). According to the present invention this airstream is supplied via the plurality of openings 20 in chamber 18 to the interior of bags 30 where the finer dust particles are collected. It will be noted that the bags 30 are exposed to the atmosphere and present a large exterior surface for handling quite a large volume of air, with the inlet openings thereto suitably approximately totaling a size equaling the cross section of duct 14. The bags are expanded to their maximum size by the airstream, and the pressure drop is optimized with the atmosphere providing no back pressure in the usual sense. When the respective bags tend to fill or at least become partially filled with dust, the sweep arm 36 is rotated through operation of motor 70 whereby mouth 74 successively communicates with the various bags. The suction brought about by blower 60 causes the immediate collapse of the bag to which the sweep arm connects, as illustrated at 86 in FIG. 1. Thus, the bag immediately impinges with some force upon the cage disposed therewithin which is effective to dislodge the dust particles from the interior of the bag. Moreover, the bag ends tend to "pop" within the end loops of the cage, as is indicated at 88, with this buckling action further dislodging dust particles while keeping the bag substantially oriented in vertical alignment with the cage. As the sweep arm passes, the air pressure from within chamber 18 once more expands the bag outwardly for the collection of dust particles.

It will also be noted that the suction which produces the collapsing of a bag and the withdrawing of dust therefrom, does so with respect to atmospheric pressure, whereby the bag is easily collapsed and the dust driven therefrom with a comparatively low power blower apparatus. That is, the capacity and horsepower of fan 60 can be comparatively low.

The apparatus according to the present invention has found particular utility in the plywood industry where centrifugal separators have been employed heretofore for removing sawdust particles and the like from the exhaust airstream. Although effective to remove larger particles, the conventional centrifugal separators frequently expel as much as 100 pounds a day or more of finer particles into the atmosphere. With the present apparatus, these additional particles are substantially removed and enable continued operation of manufacturing facilities, with removal of the undesired air pollutants at a minimum of cost. The apparatus according to the present invention is supported from the already existing plant equipment as a "hat" located thereover, and not requiring reconstruction of present plant facilities nor requiring excessive "down" time for the replacement of existing dust collecting apparatus. The present apparatus handles large volumes of air, works against atmospheric pressure, and is easily serviced by inexperienced personnel. At the same time the apparatus is foolproof and quite inexpensive since a large part of the system equipment consists of the aforementioned bags which are suspended in midair from the sides of the structure. It is understood the number of bags illustrated in the attached drawings is by way of example and that a lesser or greater number of bags can be employed as desired and found suitable for handling the flow of air without producing undue back pressure from the bag surfaces. Also, while the apparatus according to the present invention has particular utility in secondary treatment of the output from conventional dust collecting apparatus, the apparatus may alternatively be employed for the sole or primary treatment of the airstream.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. An apparatus for removing fine dust particles from an airstream, said apparatus comprising:

a substantially continuously operating funnel shaped centrifugal dust collector mounted at an exterior building location and initially receiving said airstream, and including fan means for forcing air through said centrifugal dust collector, said centrifugal dust collector also having an outlet, a plurality of bags each having an opening, said bags being pervious but closed except for said openings and through which a flow of air passes, a vertical, substantially cylindrical chamber having a long cylindrical wall, and said chamber having chamber openings, means individually connecting the openings of said bags to said chamber openings, said chamber having an entrance, coupling means providing a connection between the outlet of said centrifugal dust collector and said entrance of said chamber for receiving said airstream from the outlet of said centrifugal dust collector into said chamber so that said airstream passes through said chamber, through said bag openings via said chamber openings, into said bags, and through said bags to atmospheric pressure, with said chamber and bags being located in an environment for exposing said bags to said atmospheric pressure, said bags being supported from said chamber and being inflated from within by air blown thereinto by air pressure provided by said fan means, said bags being elongated and supported in circular vertical array comprising a circle of bags disposed around and substantially surrounding the cylindrical side wall of said cylindrical chamber where the bags receive the airstream from said chamber, said chamber being provided with a rotatable hollow sweep arm adapted for making successive connection with said bags via said chamber openings, and said sweep arm having means for providing a suction relative to atmosheric pressure for reversing air flow and withdrawing dust from the bag to which the hollow sweep arm connects.

2. The apparatus according to claim 1 wherein said means connecting the openings of said bags to said chamber openings respectively comprise duct means extending radially from said chamber openings to the bag openings for coupling the airstream from said chamber to said bags.

3. The apparatus according to claim 2 wherein said radially extending duct means are positioned in the long cylindrical wall of said chamber and are elongate longitudinally of said chamber to provide the airstream to elongate openings of said bags.

4. The apparatus according to claim 3 wherein said sweep arm is provided with a mouth dimensioned to extend from the vertical centerline of one of said radially extending duct means to the vertical centerline of the next duct means as said arm rotates.

5. The apparatus according to claim 4 including wiper means provided on the exterior of said mouth for engaging the interior wall of said chamber.

6. The apparatus according to claim 1 wherein said means connecting the openings of said bags to said chamber openings respectively comprise duct means extending radially from said chamber openings to said bag openings for coupling the airstream from said chamber to said bags, said apparatus including perforate cage means interior to and smaller than said bags, when said bags are in inflated condition, said cage means being supported from said duct means, each of said bags when inflated being spaced thereby from said cage means and duct means except that each said bag is secured in sealing relation to a said duct means supporting a said cage means, said bag collapsing against said cage means when said sweep arm provides said suction, said cage means being large enough relative to the size of said bag to maintain an interior passage for the removal of material when said bag is collapsed against said cage means when said sweep arm provides said suction.

7. The apparatus according to claim 6 wherein the volume encompassed by said cage means is on the order of one-half the interior volume of said bags when inflated so that said bags are collapsed to a size on the order of one-half of their inflated volume when the air flow is reversed to withdraw dust from within the bags so that the bags pop toward said cages when the air flow is reversed.

8. The apparatus according to claim 7 wherein said cage means are provided with end loops, said bags being longer than said cage means to pop within the end loops of said cage means when the air flow is reversed to withdraw dust from the bags.

9. The apparatus according to claim 1 further including duct means for returning dust from said hollow arm to said centrifugal dust collector.

10. The apparatus according to claim 1 wherein the aggregate cross-sectional area of said openings in said chamber is at least approximately equal to the outlet opening of said centrifugal dust collector communicating with said chamber.

11. The apparatus according to claim 1 wherein said means individually connecting the openings of said bags to said chamber openings comprise rectangular passage means extending from the side of said chamber for communicating with the openings of said bags, said apparatus further including means for removably securing said bags to the respective rectangular passage means, and cage means interior to and smaller than said bags supported from said passage means, each of said bags when inflated being spaced thereby from said cage means, said bags collapsing against said cage means when said sweep arm provides said suction, said cage means being large enough relative to the size of said bags to maintain passage for the removal of material when said bags are collapsed against said cage means when said sweep arm provides said suction.

12. The apparatus according to claim 1 wherein said bags each have a substantially cylindrical configuration, said openings in said bags being located in the cylindrical sidewalls of said bags.

13. The apparatus according to claim 1 wherein said rotatable sweep arm is located inside said chamber.

14. The apparatus according to claim 1 including thrust bearing means disposed axially of said chamber and at the upper part of said chamber for centrally supporting said sweep arm from above for rotation in said chamber, and drive means positioned adjacent said thrust bearing means for rotating said sweep arm.

15. The apparatus according to claim 1 wherein said cylindrical chamber is mounted on top of said centrifugal dust collector.

16. An apparatus for removing fine dust particles from an airstream, said apparatus comprising:

a plurality of bags each having an opening, said bags being pervious but closed except for said openings through which a flow of air passes, a chamber having chamber openings, duct means individually connecting the openings of said bags to the chamber openings, and means coupling said airstream to said chamber so that said airstream passes through said chamber, through said bag openings via said chamber openings, into said bags, and through said bags to atmospheric pressure, said bags being inflated from within by air blown thereinto, a hollow sweep arm adapted for making successive connection with said bags via said chamber openings, said sweep arm having means for providing a suction relative to atmospheric pressure for reversing air flow and withdrawing dust from a bag to which the hollow sweep arm connects, and a plurality of substantially cylindrical cages, each cage corresponding to one of said bags and each cage supported from one of said duct means, each cage having a substantially perforate cylindrical sidewall and an open loop end, each of said bags having an end and having a cylindrical sidewall disposed in surrounding relation to the cylindrical sidewall of a said cage, of said bags being larger in diameter than the cage which it surrounds and each of said bags when inflated being spaced outwardly thereby from the major portion of said cage, said bags being secured in sealing relation to said duct means which supports said cage, each of said bags crumpling against its corresponding cage when said sweep arm provides said suction, said bag as inflated being spaced from said open loop end of said cage, the adjacent end of said bag popping toward said loop end of said cage when said means provides said suction.

17. The apparatus according to claim 16 wherein the cross-sectional area within the cylindrical sidewall of the cage is on the order of approximately two-thirds of the cross-sectional area within the cylindrical inflated bag.

18. The apparatus according to claim 17 wherein the height of the cage is on the order of approximately two-thirds the inflated height of the bag.

* * * * *